Hascal A. Hogel. Apparatus for Treating Fertilizers.

No. 114508

PATENTED MAY 2 1871

Witnesses.
F. C. Robbins
Sydney E. Smith

Inventor.
Hascal A. Hogel
by Attorney
Brown, Coombs & Co

UNITED STATES PATENT OFFICE.

HASCAL A. HOGEL, OF NEW YORK, N. Y., ASSIGNOR TO EFFINGHAM H. NICHOLS, OF SAME PLACE.

IMPROVEMENT IN APPARATUS FOR TREATING ANIMAL MATTERS FOR FERTILIZERS.

Specification forming part of Letters Patent No. 114,508, dated May 2, 1871.

*To all whom it may concern:*

Be it known that I, HASCAL A. HOGEL, of the city, county, and State of New York, have invented a new and useful Apparatus for Treating Blood and Animal Matter for the Production of Fertilizers; and I do hereby declare that the following is a full, clear, and exact description thereof, reference being had to the accompanying drawing through letters of reference marked thereon forming part of this specification, and in which—

Figure 1:
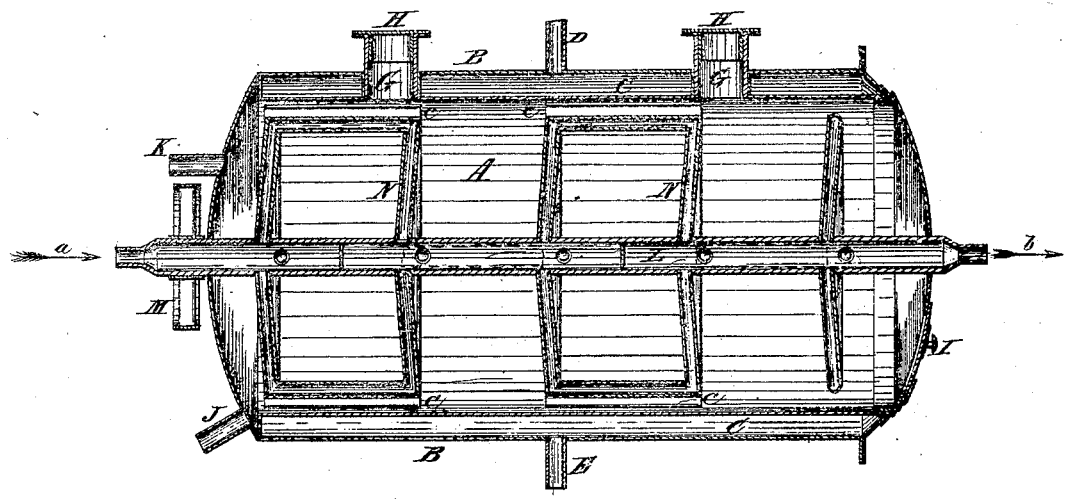
Figure 2:
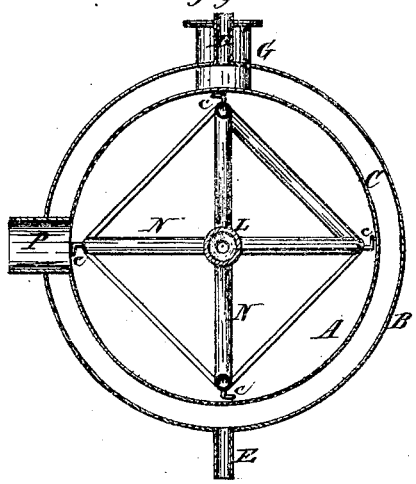

Figure 1 represents a vertical longitudinal section of my apparatus; and Fig. 2, a transverse section taken on the line $x\ x$ on Fig. 1.

The same letters indicate like parts in both figures.

The apparatus herein to be described is calculated to facilitate the processes described in my patents Nos. 100,629 and 101,131, issued on the 8th and 22d of March, 1870, respectively; and it consists in the combination of a steam-jacketed cylinder and hollow revolving agitator having a circulation of steam therethrough and provided with scrapers, which prevent adhesion of the mass to the interior of the cylinder or reservoir.

Referring to the drawing, A represents a cylindrical vessel or reservoir, which may be arranged in any convenient position, but preferably horizontal, as represented. This vessel is incased in an outer jacket, B, forming a steam-chamber, C, around it, into which steam is admitted through the tube D, and product of condensation is allowed to escape through the tube E at its lower side. The vessel A is also provided with openings G for the introduction of the raw material, which are secured by tight stoppers or caps H, and a man-hole, I, for the removal of the material after treatment; and it is also provided with an outlet, J, through which the watery portion separated from the blood or animal matter during the process may be drawn off; an air-tube, K, is also inserted in the upper portion of said vessel to give vent to the water in case of partial vacuum. Within this vessel A is a hollow shaft, L, supported in suitable bearings in the ends of said vessels, so as to be capable of rotating by means of any power applied to the drum M, or other suitable mechanical agency. This shaft L carries a series of hollow radial arms, N, so connected at their extremities that a current of steam or hot air entering said shaft in direction of the arrow $a$ will circulate through their entire length and discharge in direction of the arrow $b$ at the opposite end of said shaft. This revolving tubular agitator is also provided with scrapers $c$, attached to the extreme connecting-tubes of the arms N in the alternate positions so as to prevent the adhesion of the material to the sides of the vessel A.

In the operation of this apparatus, the blood or fleshy matter, as the case may be, is placed in the vessel A and the openings G securely closed; the agitator is then put in motion, steam or hot air being at the same time admitted and caused to circulate through it and around within the jacket B until all moisture is expelled, which, accumulating in the bottom of the vessel A, is to be drawn off from time to time through the pipe or outlet J; this action is continued until the mass is reduced to dryness, and by the agitation becomes thoroughly pulverized, which is ordinarily accomplished in about one hour.

Hot air may also be introduced through the opening P into the body of the chamber A, if desirable, to assist in drying the mass within it, and after coagulation has taken place the apertures G may be opened to allow the free escape of vapor.

What I claim, and desire to secure by Letters Patent, is—

1. The vessel A, provided with a jacket, in combination with a tubular agitator for the circulation of steam or heated air, substantially as and for the purpose specified.

2. The scrapers $c$ in combination with the tubular agitator, substantially as set forth.

HASCAL A. HOGEL.

Witnesses:
W. MORRIS SMITH,
JAMES S. GRINNELL.